US012633103B2

(12) United States Patent
Jones et al.

(10) Patent No.: US 12,633,103 B2
(45) Date of Patent: May 19, 2026

(54) SYSTEMS AND METHODS FOR INTERPRETABLE CLASSIFICATION OF IMAGES USING INHERENTLY EXPLAINABLE NEURAL NETWORKS

(71) Applicant: Mitsubishi Electric Research Laboratories, Inc., Cambridge, MA (US)

(72) Inventors: Michael Jones, Cambridge, MA (US); Suhas Lohit, Cambridge, MA (US); Anoop Cherian, Cambridge, MA (US); Zacharias Carmichael, Granger, IN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 467 days.

(21) Appl. No.: 18/226,019

(22) Filed: Jul. 25, 2023

(65) Prior Publication Data

US 2025/0037446 A1      Jan. 30, 2025

(51) Int. Cl.
*G06V 10/82*          (2022.01)
*G06V 10/40*          (2022.01)
(Continued)

(52) U.S. Cl.
CPC .............. *G06V 10/82* (2022.01); *G06V 10/40* (2022.01); *G06V 10/759* (2022.01); (Continued)

(58) Field of Classification Search
CPC ...... G06V 10/40; G06V 10/82; G06V 10/759; G06V 10/761; G06V 10/764; G06V 10/809
See application file for complete search history.

(56) References Cited

U.S. PATENT DOCUMENTS

2021/0248462 A1*    8/2021    Ni ......................... G06N 3/045

OTHER PUBLICATIONS

Li, et al. (Deep Learning for Case-Based Reasoning through Prototypes: A Neural Network that Explains Its Predictions). (Year: 2017).*

(Continued)

*Primary Examiner* — Daniel G Mariam
(74) *Attorney, Agent, or Firm* — Gene Vinokur

(57) ABSTRACT

An artificial intelligence-based image processing system comprises a processor that executes instructions stored on a memory to classify an input image with a prototypical part neural network including a backbone subnetwork, a prototype subnetwork, and a readout subnetwork to produce an interpretable classification of the input image including one or a combination of a classification result of the input image and an interpretation of the classification result. The backbone subnetwork is trained with machine learning to process the input image with an incomplete sequence of active convolutional layers producing feature embeddings representing features extracted from pixels of different regions of the input image. The prototype subnetwork is trained to compare the feature embeddings with prototypical feature embeddings to produce results of comparison and the readout subnetwork is configured to analyze the results of comparison to produce the interpretable classification of the input image.

20 Claims, 15 Drawing Sheets

(51) Int. Cl.
  *G06V 10/74*      (2022.01)
  *G06V 10/75*      (2022.01)
  *G06V 10/764*     (2022.01)
  *G06V 10/80*      (2022.01)

(52) U.S. Cl.
  CPC .......... *G06V 10/761* (2022.01); *G06V 10/764*
      (2022.01); *G06V 10/809* (2022.01)

(56) References Cited

OTHER PUBLICATIONS

"Interpretable image classification with differentiable prototypes assignment," Dawid Rymarczyk, Lukasz Struski, Michal G'orszczak, Koryna Lewandowska, Jacek Tabor, and Bartosz Zielinski, ECCV 2022.
"This Looks Like That: Deep Learning for Interpretable Image Recognition", Chaofan Chen, Oscar Li, Daniel Tao, Alina Barnett, Cynthia Rudin, and Jonathan Su., NeurIPS, 2019.

* cited by examiner

SYSTEMS AND METHODS FOR INTERPRETABLE CLASSIFICATION OF IMAGES USING INHERENTLY EXPLAINABLE NEURAL NETWORKS

TECHNICAL FIELD

The present disclosure relates generally to image processing, and more particularly to recognizing objects in an image.

BACKGROUND

Neural networks are powerful models for learning any classification or regression function. Oftentimes, it is desired that along with the results of a computation process executed with the aid of the neural network, the output of the neural network should also provide a reasoning behind why an input is classified in a certain way. One of the main drawbacks of neural networks, however, is that they are black boxes which essentially means that they provide no understanding of the reasons for why they classify the input in a particular way. A standard neural network does not provide any kind of explanation for its output. As AI becomes more advanced, humans are challenged to comprehend and retrace how the algorithm came to a result. The whole calculation process is turned into what is commonly referred to as a "black box" that is impossible to interpret. These black box models are created by the neural network directly from the data and, not even the engineers or data scientists who designed the algorithm can understand or explain what exactly is happening inside them or how the AI algorithm arrived at a specific result.

Explainable artificial intelligence (XAI) is a set of processes and methods that allows human users to comprehend and trust the results and output created by machine learning algorithms. Explainable AI is used to describe an AI model, its expected impact and potential biases. It helps characterize model accuracy, fairness, transparency and outcomes in AI-powered decision making. Explainable AI is crucial for an organization in building trust and confidence when putting AI models into production. AI explainability also helps an organization adopt a responsible approach to AI development.

Some advancements in explainable AI have been achieved using prototypical part networks sometimes also referred to as part prototypical networks. Prototypical part networks attempt to add some interpretability to a neural network by learning a set of prototype parts for each training class. A prototype part is intended to represent a distinctive local region from an image of an object. However, all such means to learn prototype parts suffer from the problem of poor explainability. For example, within the realm of image processing the prototypes learned by available prototypical part networks actually have a receptive field that includes the entire input image and not a local region of the input image.

Accordingly, improved ways of realizing explainable AI that can provide robust explanation of the reasoning behind classification of input are required.

SUMMARY

It is an objective of some embodiments to provide means for making AI-based decision making more understandable and interpretable. Some example embodiments are directed towards making deep neural networks explainable in an efficient manner. Some example embodiments are also directed towards the objective of improving the integration and adoption of AI-based models to the technical fields of image processing, anomaly detection, and data security.

Some example embodiments are based on the realization that there are many advantages associated with an understanding of how an AI-enabled system has led to a specific output. For example, explainability can help ensure that the system is working as expected, or it might be necessary to meet regulatory standards, or it might be important in allowing those affected by a decision to challenge or change that outcome. Some example embodiments also realize that explainability in AI is crucial for adoption and integration of AI systems with other devices and algorithms. Some example embodiments also realize that AI model performance may drift or degrade because production data differs from training data. This makes it crucial to continuously monitor and manage models to promote AI explainability while measuring the business impact of using such algorithms. Explainable AI also helps promote end user trust, model auditability and productive use of AI. It also mitigates compliance, legal, security and reputational risks of production AI.

Some example embodiments are based on another realization that in order to fulfill aforementioned needs and standards, the explainability of AI based decision making should be robust and unambiguous. Some example embodiments also realize that in order to improve classification accuracy, it is desired that the receptive field for learning a prototype should encompass the entire input data.

It is also a realization of some example embodiments that in the context of AI-based image processing, one way to provide explainability for classification of data is to match learned prototype parts with parts of the input image and identify the best matching prototypes and the corresponding matching locations in the input image for providing explainability for the prototypical part network's output. For example, the explanation may be that a certain set of parts (i.e., regions) of the input image matched well to a certain set of prototypical parts for a particular object class. The explainability of such prototypical part networks is limited to explanations of the form, "these regions in the input image matched these parts of typical images of a certain object class which is why that object class was chosen as the output". However, several applications require more meaningful explanations for the classification decision such as those that can help tune the underlying AI-model. Accordingly, some example embodiments are based on the realization that for classification purposes, learning prototypes having a receptive field that includes the entire input data may not be optimal for producing an explanation for the classification.

Some example embodiments provide systems and methods for improved explainability of the underlying AI algorithms. Some example embodiments provide means and measures for prototypical part networks that improve explainability by learning prototypes that truly correspond to local regions of an image.

Several embodiments of the invention reflect an appreciation that as AI approaches become more sophisticated, decisions are increasingly being made by ML models whose design, and the rationale of its decision-making processes, are opaque to the user. Certain embodiments of the invention likewise reflect an appreciation that the opaqueness of such ML models hinders AI explainability, and by extension, undermines a user's trust of the outcomes it produces. Accordingly, certain embodiments of the invention reflect an appreciation that AI explainability ideally provides a user interpretable insight into how and why an ML model performed certain actions or arrived at a particular decision. At this point, it is imperative to understand that although an AI model may provide better decision making than other means, lack of a robust explainability for such a model may inhibit its adoption for scaled operations. One important application area to which some example embodiments cater is image processing using an artificial intelligence based model.

Several example embodiments are directed to an improved network architecture for image classification. The improved network architecture includes mechanisms for learning a set of prototypes for each training class which are associated with local regions of training images. During classification, the learned prototypes are matched to local regions of an input image as part of the process to classify the image (such as classifying the object type contained in the image). The best matching prototypes serve as an explanation for why an image is classified a certain way. The prototypes may be used to say that certain parts of the image matched certain parts of training images which provide evidence for the final classification of the image. In some example embodiments, using the prototype part subnetworks, the neural network can offer the best matching prototypes and the locations where they best matched as evidence for a particular classification.

Some example embodiments also realize that the processing time for such classification is a critical parameter for adoption of explainable AI in many applications. Some example embodiments also realize that processing time for classification of images depends on whether the prototypes correspond to local regions of training images or to an entirety of the training image. Accordingly, it is an objective of some example embodiments to reduce the processing time for classification of input images. In this regard, some example embodiments constrain the receptive field of network layers from which prototypes are taken.

It is an objective of some example embodiments to constrain the embedded patches of training images from which prototypes are taken to correspond to local regions of the input image and not the full image. Some example embodiments thus modify a count of the layers used for extracting features from the input image to be less than a full count of the layers available for feature extraction. Thus, some example embodiments utilize an incomplete sequence of layers for producing feature embeddings representative of features extracted from pixels of different regions of the input image. In this context, a complete sequence of the extraction layers may be understood to cause each of the feature embeddings to include features derived from pixels of the entire input image. In this way, the number of layers used (i.e., active layers) for feature extraction may be a tunable parameter and explainability of the AI-based decision-making during classification of the input image can be fine tuned according to requirement by adjusting the number of layers utilized for feature extraction. In some example embodiments, the number of active layers to be utilized may be accepted as a parameter for the image classification.

Some example embodiments lead to local prototypes which truly correspond to object parts in the input image, and accordingly, the neural network disclosed herein has better interpretability according to different interpretability metrics. Additionally, since the improved neural network disclosed herein has provisions to utilize fewer than the total number of available layers for feature extraction, the overall time taken for image classification is significantly reduced.

Thus, along with an improved explainability of the AI-based image classification, some example embodiments also lead to a faster image classification system. As such, several application areas which would otherwise have not incorporated AI-based decision making can now benefit from seamless integration of the disclosed AI-based image classification methods and systems to perform various tasks.

In order to achieve the aforesaid objectives and advancements, some example embodiments provide systems, methods, and computer program products for artificial intelligence-based image processing for interpretable classification of input images.

Some example embodiments provide an AI-based image processing system for interpretable classification of input images. The system comprises a processor and a memory having instructions stored thereon that, when executed by the processor, cause the AI image processing system to classify an input image with a prototypical part neural network and output an interpretable classification of the input image. The prototypical part neural network produces an interpretable classification of the input image including one or a combination of a classification result of the input image and an interpretation of the classification result. In this regard, the prototypical part neural network includes a backbone subnetwork, a prototype subnetwork, and a readout subnetwork. The backbone subnetwork is trained with machine learning to process the input image with an incomplete sequence of active convolutional layers producing feature embeddings representing features extracted from pixels of different regions of the input image. The prototype subnetwork is trained to compare the feature embeddings with prototypical feature embeddings to produce results of comparison and the readout subnetwork analyzes the results of comparison to produce the interpretable classification of the input image.

In yet another example embodiments, an image processing method for interpretable classification of input images is provided. The method comprises classifying an input image with a prototypical part neural network including a backbone subnetwork, a prototype subnetwork, and a readout subnetwork for producing an interpretable classification of the input image including one or a combination of a classification result of the input image and an interpretation of the classification result. The prototypical part neural network includes a backbone subnetwork, a prototype subnetwork, and a readout subnetwork. The backbone subnetwork is trained with machine learning to process the input image with an incomplete sequence of active convolutional layers producing feature embeddings representing features extracted from pixels of different regions of the input image. The prototype subnetwork is trained to compare the feature embeddings with prototypical feature embeddings to produce results of comparison and the readout subnetwork analyzes the results of comparison to produce the interpretable classification of the input image. The method further comprises outputting the interpretable classification of the input image.

In yet some other example embodiments, a non-transitory computer readable medium having stored thereon computer executable instructions for performing a method for interpretable classification of input images is provided. The method comprises classifying an input image with a prototypical part neural network including a backbone subnetwork, a prototype subnetwork, and a readout subnetwork for producing an interpretable classification of the input image including one or a combination of a classification result of the input image and an interpretation of the classification result. The prototypical part neural network includes a backbone subnetwork, a prototype subnetwork, and a readout subnetwork. The backbone subnetwork is trained with machine learning to process the input image with an incomplete sequence of active convolutional layers producing feature embeddings representing features extracted from pixels of different regions of the input image. The prototype subnetwork is trained to compare the feature embeddings with prototypical feature embeddings to produce results of comparison and the readout subnetwork analyzes the results of comparison to produce the interpretable classification of the input image. The method further comprises outputting the interpretable classification of the input image.

BRIEF DESCRIPTION OF DRAWINGS

The presently disclosed embodiments will be further explained with reference to the following drawings. The drawings shown are not necessarily to scale, with emphasis instead generally being placed upon illustrating the principles of the presently disclosed embodiments.

Figure 1A:
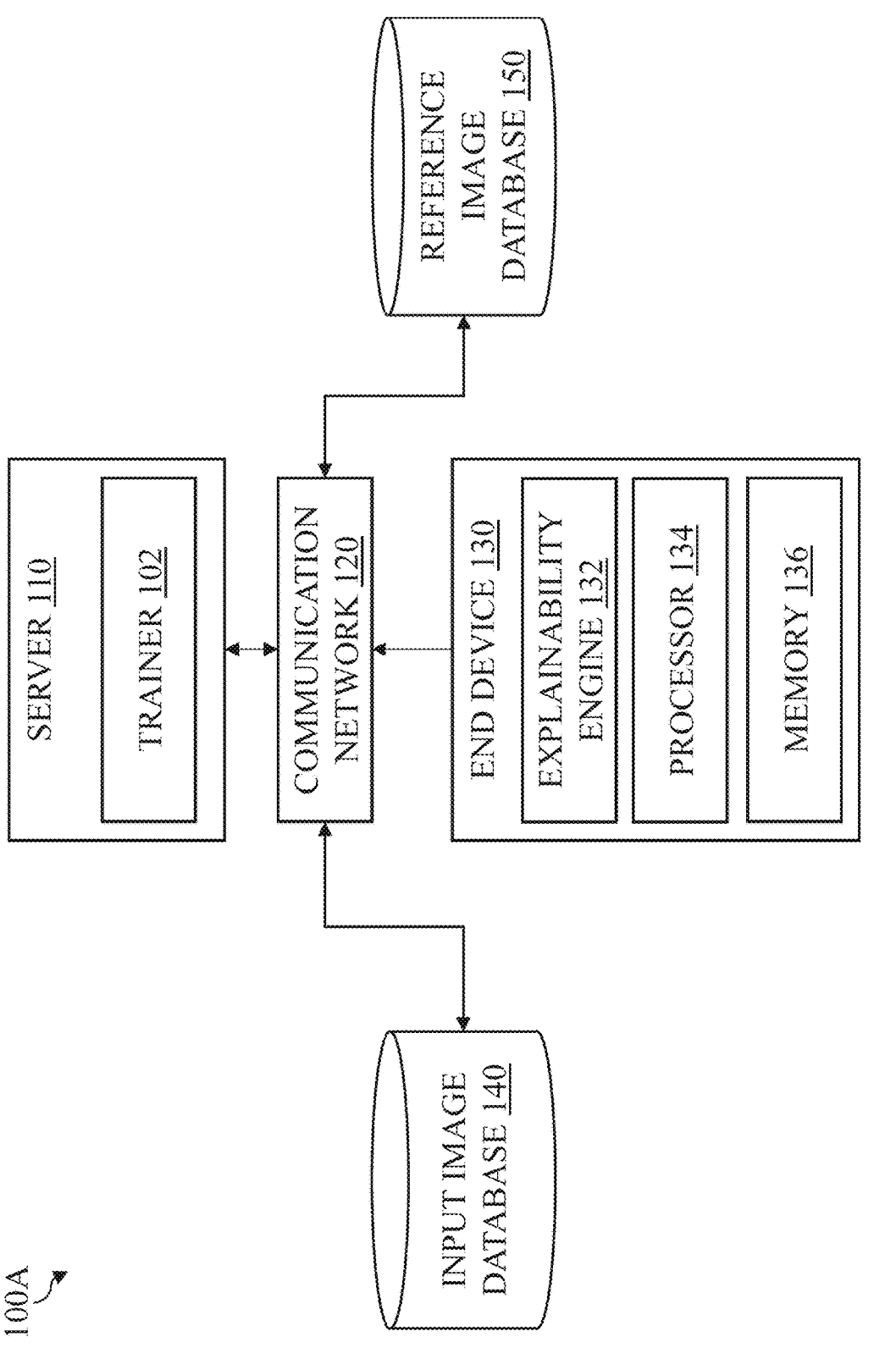
FIG. 1A illustrates a block diagram of a framework of an AI-based explainability engine, according to some example embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like-reference numbers and designations in the various drawings may indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Neural networks of different types are finding use in many applications. There have been increasing attempts to automate many tasks with the aid of artificial intelligence in order to introduce agility and speed in the execution of such tasks. Neural networks are powerful models for learning any classification or regression function. When provided with an input, a trained neural network classifies at least some of the portions of the data into certain learned classes. However, standard neural networks do not provide reasoning behind such a classification and it leaves a gap in the understanding of how neural networks operate and execute tasks. As AI becomes more advanced, humans are challenged to comprehend and retrace how the algorithm came to a result. This aspect of the understanding of how AI-based models implemented using neural networks classify data is termed as explainability of the output of such networks. The explainability of AI-based models is of significant importance in many applications and use cases. Ensuring completeness and trustworthiness of the explainability in AI-based decision making is also another challenge in this technical field. The significance of explainability of the AI decision making processes can be understood from the fact that it is crucial for an organization to have a full understanding of the AI decision-making processes with model monitoring and accountability of AI and not to trust them blindly. Explainable AI can help humans understand and explain machine learning (ML) algorithms, deep learning and neural networks.

Machine learning (ML) models are often thought of as black boxes that are impossible to interpret. Neural networks used in deep learning are some of the hardest for a human to understand. Bias, often based on race, gender, age or location, has been a long-standing risk in training AI models. Further, AI model performance can drift or degrade because production data differs from training data. This makes it crucial to continuously monitor and manage models to promote AI explainability while measuring the business impact of using such algorithms. Explainable AI also helps promote end user trust, model auditability and productive use of AI. It also mitigates compliance, legal, security and reputational risks of production AI.

Explainable AI is one of the key requirements for implementing responsible AI, a methodology for the large-scale implementation of AI methods in real organizations with fairness, model explainability and accountability. In order to help adopt AI responsibly, organizations need to embed ethical principles into AI applications and processes by building AI systems based on trust and transparency. All of this requires a robust explanation of the reasoning behind how the model arrived at a decision-something which is lacking in available models.

With explainable AI, technicians can troubleshoot and improve model performance while helping stakeholders understand the behaviors of AI models. Investigating model behaviors through tracking model insights on deployment status, fairness, quality and drift is essential to scaling AI. Continuous model evaluation empowers us to compare model predictions, quantify model risk and optimize model performance. Displaying positive and negative values in model behaviors with data used to generate explanation speeds model evaluations.

Accordingly, as used herein, interpretability or explainability refers to the degree in which an observer may understand the cause of decision. In a machine learning sense, therefore, interpretability or explainability refers to the ability to interpret or explain how a machine learning model generated results, why the machine learning model generated the results, and/or the like. As machine learning models become more and more complex, however, it may be difficult to directly interpret or explain the machine learning results. However, known AI engines do not retain a provenance of the deduction processes that they apply—e.g., they do not retain a log of rules that have been applied by the engine. Moreover, known techniques do not provide for traceability (including full traceability) and provenance of interpretation, reasoning, deliberation, and adjudication through various layers, including from raw evidence through final observation, conclusion, and recommendation. Furthermore, known techniques do not provide flexibility in presenting generated recommendations and/or remediations, adaptability in light of evolving needs, nor minimization and localization of necessary changes within systems. Furthermore, known techniques do not provide robust and flexible frameworks for applying different taxonomy/vocabulary/logic at each of a plurality of layers, generating output data and explainability outputs at each of the plurality of layers, and allowing localized modification of any of the layers without modification of other layers.

Accordingly, it is an object of some example embodiments to provide means for making AI-based decision making more understandable and interpretable. Some example embodiments are directed towards making deep neural networks explainable in an efficient manner. Some example embodiments are also directed towards the objective of improving the integration and adoption of AI-based models to the technical fields of image processing, anomaly detection, and data security. Within the realm of image processing, the processing time for classification of images depends on whether the prototypes correspond to local regions of training images or to an entirety of the training image. Accordingly, it is an objective of some example embodiments to reduce the processing time for classification of input images. In this regard, some example embodiments constrain the receptive field of network layers from which prototypes are taken.

In order to achieve the aforesaid objectives and advancements, some example embodiments provide systems, methods, and computer program products for artificial intelligence-based image processing for interpretable classification of input images. A detailed description of the structural and operational aspects of such embodiments is provided next.

FIG. 1A illustrates a block diagram of a framework 100A of an AI-based explainability engine, according to some example embodiments. The explainability engine 132 may be implemented as a prototypical part neural network on an end device 130 such as a computing device equipped with a processor 134 and a memory 136. The end device 130 may be realized as a standalone computing device or a distributed computing device such as one implemented on a cloud server. The processor 134 may perform functions according to instructions stored on the memory 136. The explainability engine 132 may be embodied as one or more computer programs or software or as a mixture of hardware and software. The end device 130 may interface with a server 110, an input image database 140 and a reference image database 150 through a communication network 120. Thus, the processor 134 may fetch or accept data from the server 110 and/or the databases 140 and 150. The input image database 140 may store input images for processing by the end device 130. The input image database 140 may be compiled using images provided by a suitable imaging source. The input images stored in the input image database 140 may comprise still images as well as videos of one or more scenes comprising objects. The reference image database 150 may store training images that are utilized by the trainer module 102 to train the explainability engine 132. In some example embodiments, one or both of the databases 140 and 150 may partition a video into frames and store in a suitable storage medium.

The server 110 may have stored thereon a trainer module 102 embodied as a software program and implemented through suitable computing equipment. As a part of the training process, the explainability engine 132 may be trained to learn a plurality of prototypes or objects or parts thereof. The explainability engine 132 may be trained to learn a set of prototype parts corresponding to each training class. At runtime, these learned prototype parts may be matched to parts of one or more input images of the input image database 140 to determine the best matching prototypes and the corresponding matching locations in the input image to provide a way of explaining the explainability engine's output.

The architecture of the explainability engine 132 may comprise a cascaded combination of multiple sub-networks. Details of the structural and operational aspects of the explainability engine 132 are provided next with reference to FIG. 1B which illustrates a workflow of the AI-based explainability engine 132, according to some example embodiments. Although these details are explained within the context of image processing, it may be contemplated that the explainability engine may likewise be applicable to any form of input data.

Figure 1B:
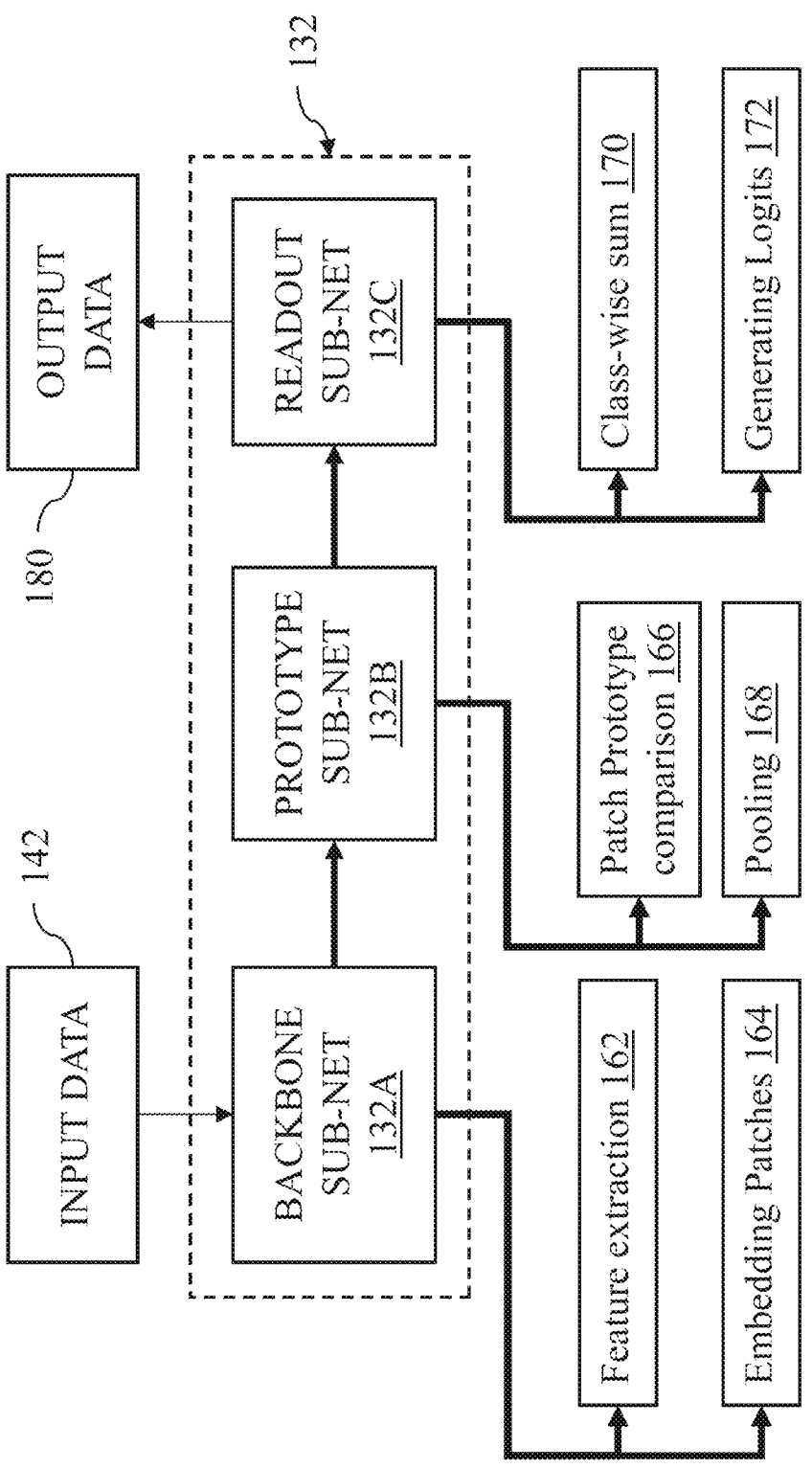
FIG. 1B illustrates a workflow of the AI-based explainability engine, according to some example embodiments.

Referring to FIG. 1B, the explainability engine 132 implemented as a prototypical part neural network comprises a backbone subnetwork 132A, a prototype subnetwork 132B, and a readout subnetwork 132C. The explainability engine 132 takes input data 142 as an input to the backbone subnetwork 132A and outputs a classification result for the input data and an explainability of the classification as output data 180. In some example embodiments, the input data may be an image captured by a suitable imaging device. The backbone subnetwork 132A is trained to learn a set of prototypes for each training class which are associated with local regions of training images. In some example embodiments, the backbone subnetwork 132A is trained with machine learning to process the input image with an incomplete sequence of active convolutional layers producing feature embeddings representing features extracted from pixels of different regions of the input image. As a part of the workflow of its workflow, the backbone subnetwork 132A performs the functions of feature extraction 162 and embedding 164 the patches of the input image. In this regard, the backbone subnetwork 132A comprises a plurality of embedding layers for producing the feature embeddings. The embedding layers may be realized with different neural network layers, for example a series of convolutional layers with Rectified Linear unit (ReLu) or other nonlinear activation functions. According to some example embodiments, a complete sequence of the active convolutional layers of the backbone subnetwork 132A causes each of the feature embeddings to include features derived from pixels of the entire input image. As such, by utilizing an incomplete sequence of the active convolution layers (i.e., less than the total number of layers in the complete sequence), example embodiments of the present invention result in significant reduction in the processing time required for generating feature embeddings which in turn speeds up the overall image classification job and consumes less processing resources when compared to standard AI-models.

The prototype subnetwork 132B is trained to compare the feature embeddings extracted from the input image with prototypical feature embeddings obtained from training images. As a part of the workflow of its workflow, the prototype subnetwork 132B performs the functions of patch prototype comparison 166 and pooling 168 the similarity scores obtained as an outcome of the prototype comparison. According to some example embodiments, a set of prototype embeddings may be defined for each training class and may be learned along with the other network weights during training. During execution, the prototype subnetwork 132B compares each prototype with every patch (feature embedding) of the input image according to a distance function to yield a similarity map per prototype. The prototype subnetwork 132B then pools the similarity map using max pooling to yield a set of scalar similarity scores per prototype.

The readout subnetwork 132C analyzes the results of comparison performed by the prototype subnetwork 132B to produce an interpretable classification of the input image. As a part of its workflow, the readout subnetwork 132C performs the functions of class-wise sum 170 of the similarity scores for all prototypes and generating 172 logits accordingly. According to some example embodiments, the readout subnetwork 132C sums the similarity scores for all prototypes of a particular class to yield a similarity score per class. These similarity scores are then converted using a softmax function to a set of probabilities per class. Given a classification for an input image, the best matching prototypes for that class are shown along with the locations in which they had the highest similarity to provide an explanation for why the image was classified the way it was.

In some example embodiments, as a part of the output data 180, the classification of portions of the image into one or more classes and the associated explainability/rationale behind each classification may be provided. That is, the explainability engine 132 predicts the object class present in the input image and provides justifications for its output in terms of image regions from training images (called prototypical parts) for the output class which best fit the input image. The best fitting prototypical parts represent the reasons for the classification decision of the network, i.e. "this output class was selected because the input image has parts that closely match these prototypical parts seen in training images of this class."

The operational aspects of the explainability engine 132 can be understood with a description of an exemplary deep neural network for interpretable classification of input images for object recognition. In this regard, FIG. 2A illustrates a network architecture 200A of one such deep neural network for interpretable classification of input images for object recognition, according to some example embodiments and FIG. 2B illustrates a flowchart 200B of steps performed by an AI-based image processing system for interpretable classification of input images, according to some example embodiments.

Figure 2A:
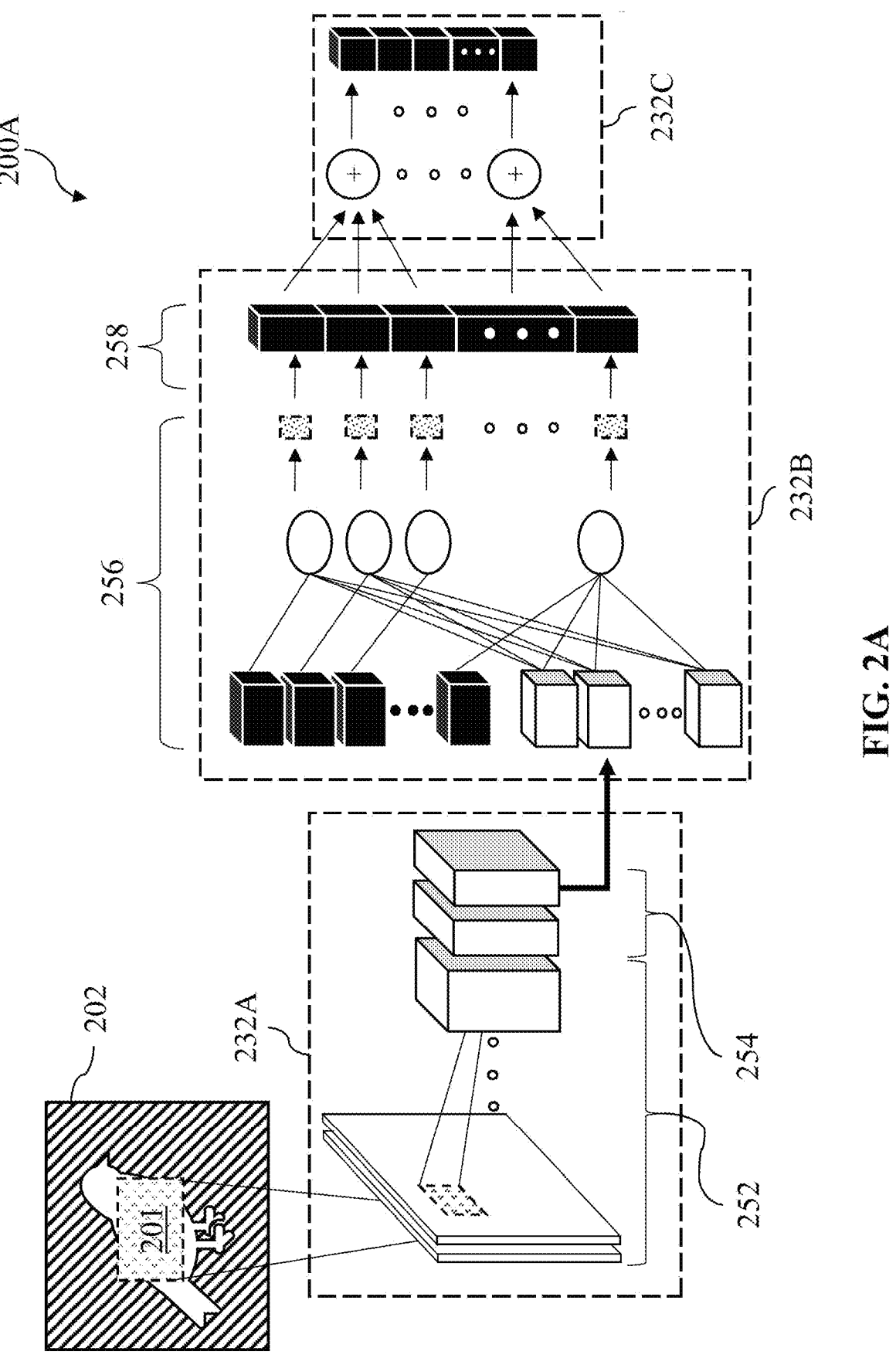
FIG. 2A illustrates a network architecture of a prototypical part neural network for interpretable classification of input images for object recognition, according to some example embodiments.
Figure 2B:
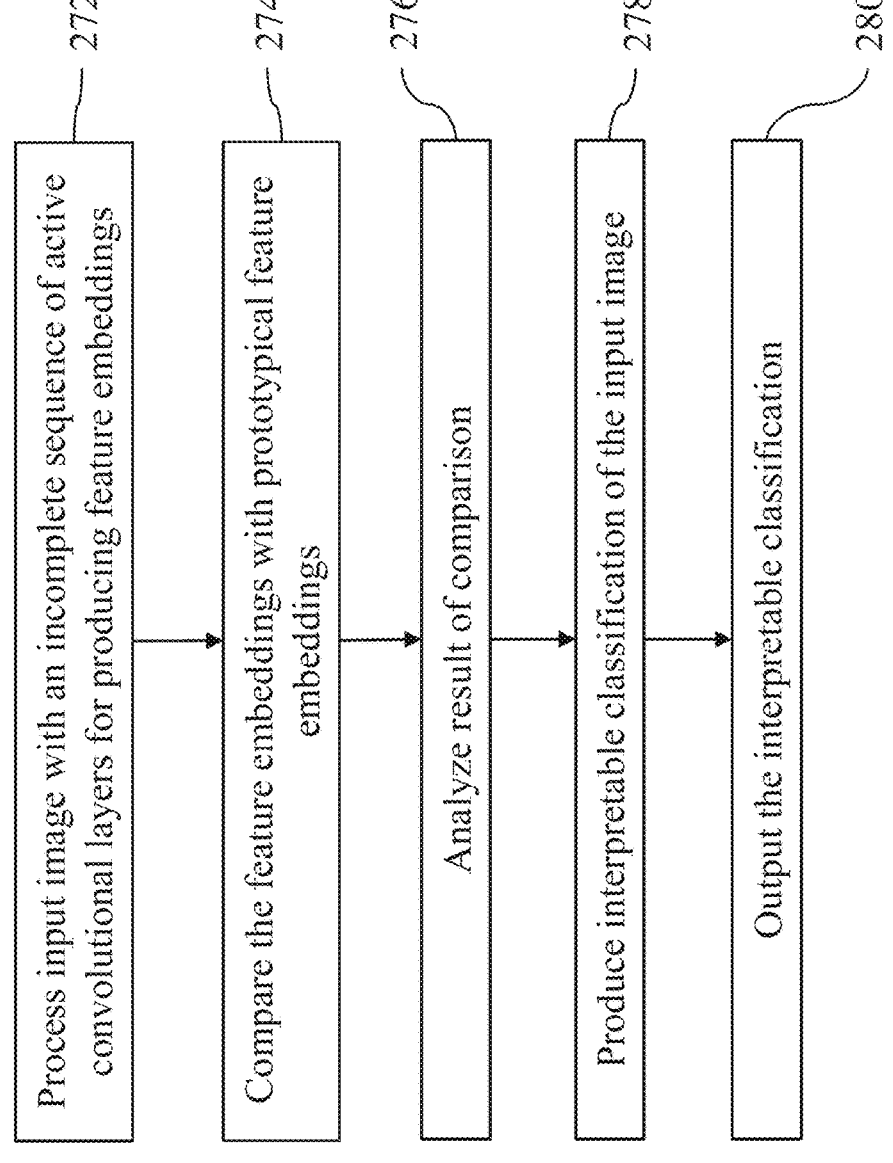
FIG. 2B illustrates a flowchart of steps performed by an AI-based image processing system for interpretable classification of input images, according to some example embodiments.

Referring to FIGS. 2A and 2B, the deep neural network is realized by a backbone subnetwork 232A, a prototype subnetwork 232B, and a readout subnetwork 232C. The deep neural network may be considered to be trained in a manner such that the backbone subnetwork 232A is trained to process 272 the input image 202 with an incomplete sequence of active convolutional layers producing feature embeddings in a manner similar to the one described with reference to FIG. 1B. The feature embeddings are compared 274 with prototypical feature embeddings obtained from training images and learned by the deep neural network during training, to obtain similarity scores as a part of the result of comparison. The results of comparison in the form of similarity scores are analyzed 276 to produce 278 an interpretable classification of the input image. According to some example embodiments, the trained deep neural network is configured for execution by a computing circuitry to process the input image 202 to produce 278 one or more classifications for the input image 202 and output 280 the classifications along with an explanation of the reasons behind the classifications. Hereinafter, the output class and the explanation behind the classification may together be referred to as an interpretable classification.

Referring to FIG. 2A, the backbone subnetwork 232A comprises a plurality of convolutional neural network (CNN) layers responsible for embedding an image. The backbone subnetwork 232A takes the input image 202 as input. In some example embodiments, the input image 202 may be a three-channel RGB color image and can be represented as $x_i \in \mathbb{R}^{3 \times H \times W}$ where H is the height of the image in pixels and W is the width in pixels. The backbone subnetwork 232A outputs a feature map of the embeddings and can be represented as $Z_i \in \mathbb{R}^{D \times H_z \times W_z}$ where $H_z$ is the height of the feature map in pixels and $W_z$ is the width in pixels. The feature embeddings may be generated in a sliding window manner by performing feature extraction patch by patch on the input image 202. The bounded box 201 shows one such patch of the input image 202. As is shown in FIG. 2A, the backbone subnetwork 232A comprises a plurality of core layers 252 represented as $f_{core}$ and a plurality of add-on layers 254 represented as $f_{add}$. The core layers 252 may be realized with any of various convolutional neural networks. The core layers 252 extract many channels of high-level features from the input image 202. The add-on layers 254 are responsible for reducing the number of channels in the output of the core layers 252 in order to make the resulting feature representation more efficient. In some example embodiments, the add-on layers 254 comprise two 1×1 convolutional layers with a ReLu function for a first one of the convolutional layers and a sigmoid activation function for a second one of the convolutional layers.

The full feature embedding function for the backbone subnetwork 232A may be denoted by $f = f_{add}(f_{core})$. This function $f$ yields the embedded patches:

$$f(x_i) = Z_i \in \mathbb{R}^{D \times H_z \times W_z}$$

which have D channels, a height of $H_z$, and a width of $W_z$. $Z_i$ is the feature map and corresponds to the final output of the backbone subnetwork 232A. The feature map has $H_z \times W_z$ pixels, and each pixel is a length D vector of real values.

Figure 3A:
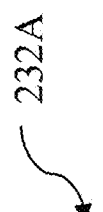
FIG. 3A illustrates a diagram of feature maps of convolutional layers that make up the backbone subnetwork of the prototypical part neural network of FIG. 2A, according to some example embodiments.
Figure 3A:
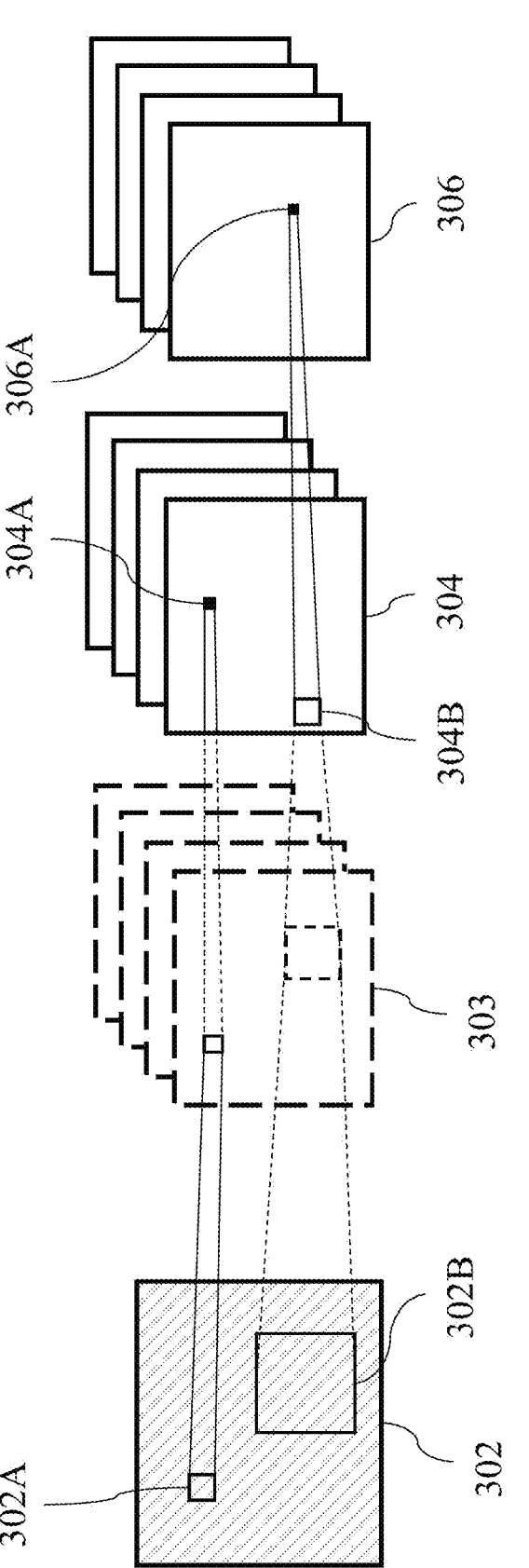

FIG. 3A illustrates a diagram of feature maps of convolutional layers that make up the backbone subnetwork 232A of the deep neural network of FIG. 2A, according to some example embodiments. As is shown in FIG. 3A, a pixel 306A in a feature map 306 is computed from a neighborhood 304B of pixels in the feature map 304 preceeding it. Similarly, the pixel 304A is computed from a neighborhood of pixels in the feature map preceeding it. This continues for the intermediate feature maps 303 until the input image 202 is reached. The size of a neighborhood depends on the details of the backbone convolutional neural network chosen. For example, without limitation, in some example embodiments the size of the neighbourhood may be typically a 3×3 or a 5×5 neighborhood. The pixels of the second-to-last layer feature map 304 depend, in turn, on an even larger neighborhood of pixels in the feature map before it (amongst the intermediate feature maps 303). The set of pixels in the input image 202 that are used to compute a pixel in the final feature map 306 is called the receptive field. For example, the set of pixels 302B is a receptive field for the pixel 306A in the feature map 306. Similarly, the set of pixels 302A is a receptive field for the pixel 304A in the feature map 304.

Figure 3B:
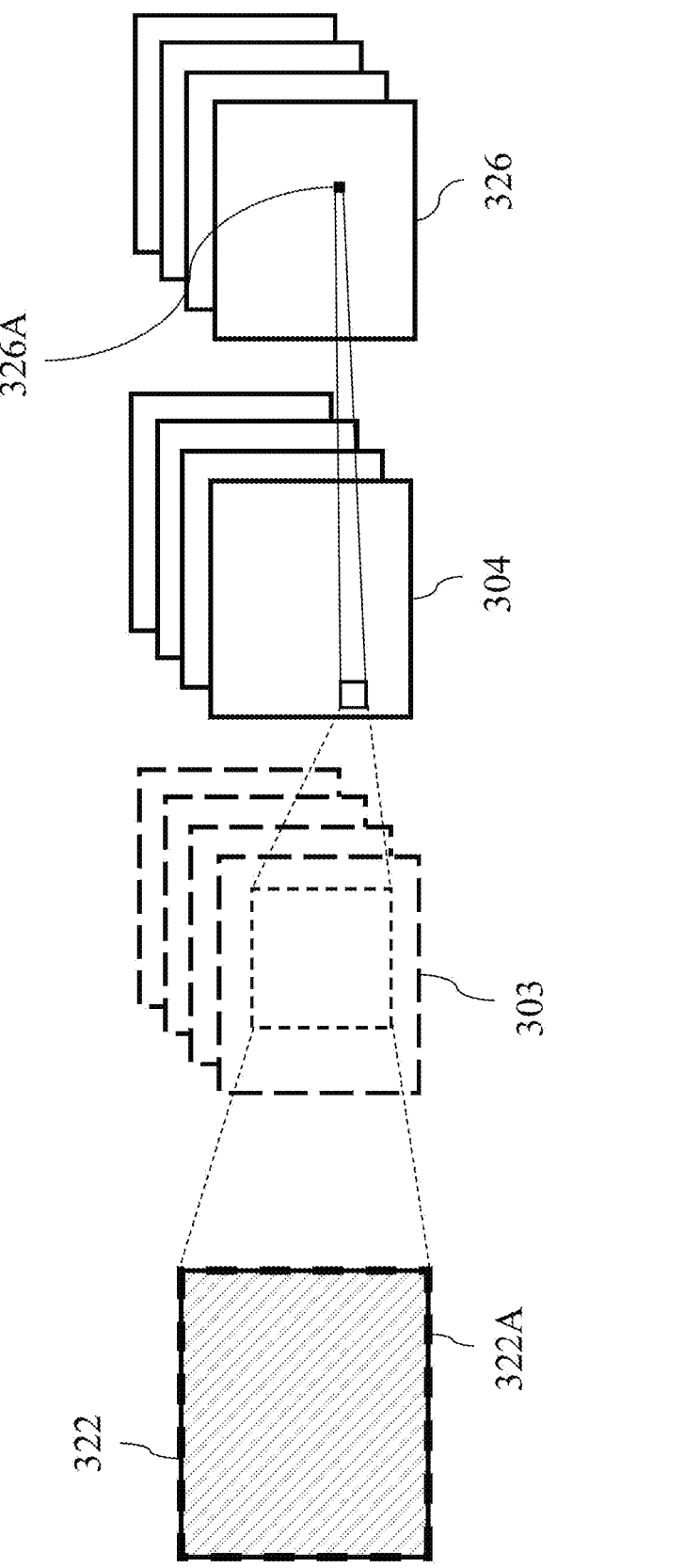
FIG. 3B illustrates a diagram showing a complete number of active convolutional layers making up the backbone subnetwork of FIG. 3A, according to some example embodiments.

As is shown in FIG. 3A, the number of convolutional layers in the backbone subnetwork directly affects the size of the receptive field of each pixel in the final feature map. The more convolutional layers there are in the backbone layers, the larger the receptive field 302B will be for the pixel 306A in the final feature map 306. In some scenarios, if the number of backbone layers is large enough, then each pixel of the final feature map 306 will have a receptive field that is the size of the entire input image 202. Such a number of layers may be referred to as a "complete" number of layers. This is illustrated in FIG. 3B wherein for the pixel 326A in the final feature map 326, the receptive field 322A corresponds to the entire input image 322. In such scenarios, the count of convolutional layers (i.e., all intermediate layers 303 and 304) making up the backbone subnetwork is larger than or equal to a threshold. Thus, the number of convolutional layers making up the backbone subnetwork for which the receptive field of a pixel in the final feature map has a receptive field that covers the entire input image (i.e. all the pixels in the input image) may be referred to a complete number of layers.

However, in some scenarios, if the number of layers is fewer than a complete number of layers, the backbone layers may be considered to be having an "incomplete" number of layers. Referring to FIG. 3A, a pixel in the final feature map 306 for an incomplete number of layers has a receptive field that corresponds to a local region 302B of the input image 202 which is also called a part of the input image 202. For example, in the scenario illustrated in FIG. 3A, for an incomplete number of active convolutional layers, the pixel 304A in the feature map 304 has its receptive field 302A which corresponds to a local region of the input image 202. For a complete number of layers, as illustrated in FIG. 3B, the final feature map has receptive fields that cover the entire input image and therefore do not correspond to a local region or part. A complete number of layers typically results in higher accuracy while having lower interpretability and greater processing delay. An incomplete number of layers results in higher interpretability because pixels in the final feature map 304 represent local regions (such as 302B) of the input image 202 which are used as prototypes in the system of FIG. 2A. Also, the incomplete number of layers incurs lower processing delay. Therefore, according to desired levels of preciseness in the explainability of the decision making, the number of layers to be used may be fine tuned. In this regard, some example embodiments consider the number of active convolutional layers to be used in the decision making to be a user defined or tunable parameter. In some example embodiments, the optimum number of layers to be used may be determined dynamically by comparing the final outcome with a threshold result and if the outcome is not similar to the result, the process may be repeated. In this way, in some example embodiments, the same input image may be iteratively processed by different layers of the backbone subnetwork with a different number of active convolutional layers selected in each iteration. In some example embodiments, the number of layers may be selected as a parameter, for example, based on a user-defined input.

Figure 3C:
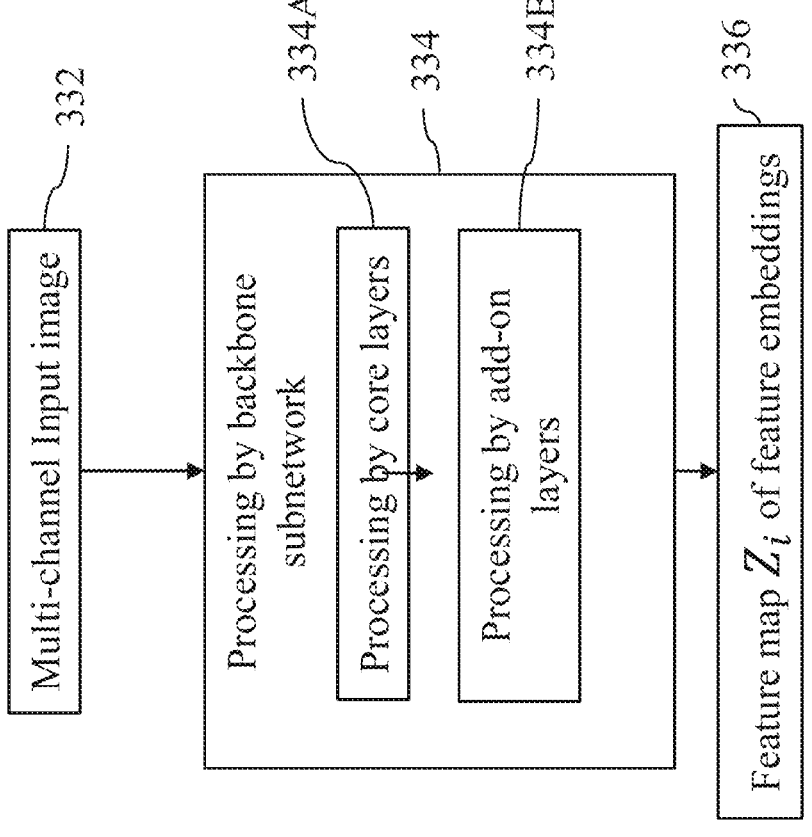
FIG. 3C illustrates a flowchart of steps performed by the backbone subnetwork of FIG. 3A, according to some example embodiments.

FIG. 3C illustrates a flowchart of steps performed by the backbone layers of FIG. 3A, according to some example embodiments. FIG. 3C will be described in reference to FIGS. 2A and 3A. The backbone subnetwork 232A takes a multi-channel image 332 as its input. Depending on the specific embodiment, the backbone subnetwork 232A may consist of a number of convolutional and pooling layers along with nonlinear activation functions which make up the core layers 252. As a part of the processing 334 by the backbone subnetwork, the core layers 252 process 334A the input image to compute many channels of high-level features from the input image 202. This may be followed by processing 334B by the add-on layers 254 that map the many channels output by the core layers 252 to a smaller set of channels to reduce the size of the feature embeddings. At step 336, the backbone subnetwork 232A outputs the final feature map $Z_i$ which is provided to the prototype subnetwork 232B for further processing.

Referring back to FIG. 2A, the prototype subnetwork 232B finds the most similar embedded patch z of the input image 202 for each prototype. Within the context of this invention, each prototype may be understood as the embedding of some prototypical part of an object. Each prototype is class-specific and the set of prototypes belonging to a class $y_i$ is denoted as $P_{y_i} \subseteq \mathbb{P}$. Prototype subnetwork 232B comprises comparison layers 256 for patch-prototype comparison and pooling layers 258. At the comparison layers 256, pairwise distance between features and the prototypes is computed. At the pooling layers 258, a min-pooling operation is performed to obtain the closes embedded patch for each prototype. In this manner, each prototype is assigned a single embedded patch. The distances output by the comparison layers 256 are converted into similarity scores at the pooling layers 258. A detailed explanation of the functional and operational aspects of the prototype subnetwork 232B is provided next with reference to FIGS. 4A and 4B.

Figure 4A:
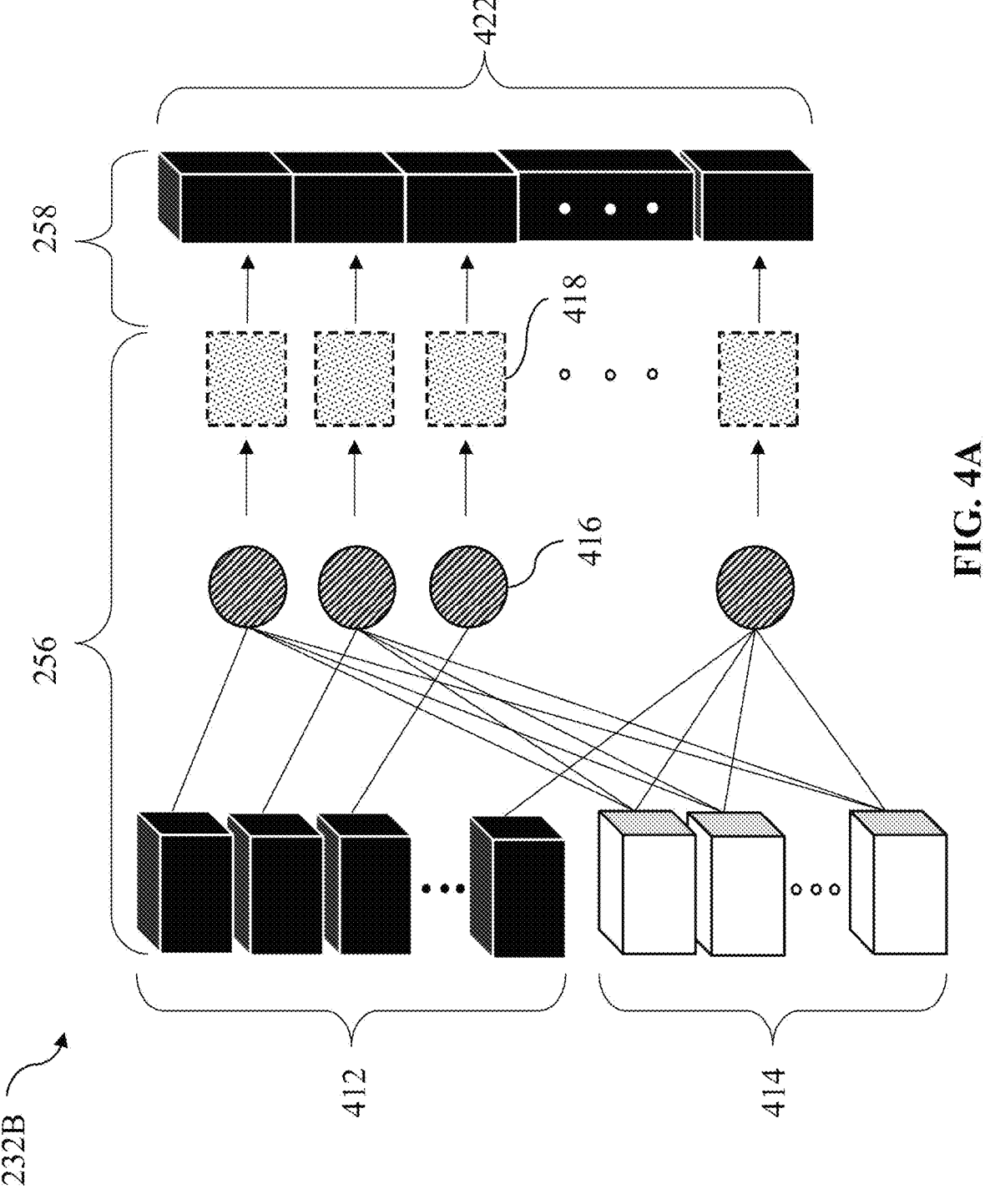
FIG. 4A illustrates a diagram of the prototype subnetwork of the prototypical part neural network of FIG. 2A, according to some example embodiments.
Figure 4B:
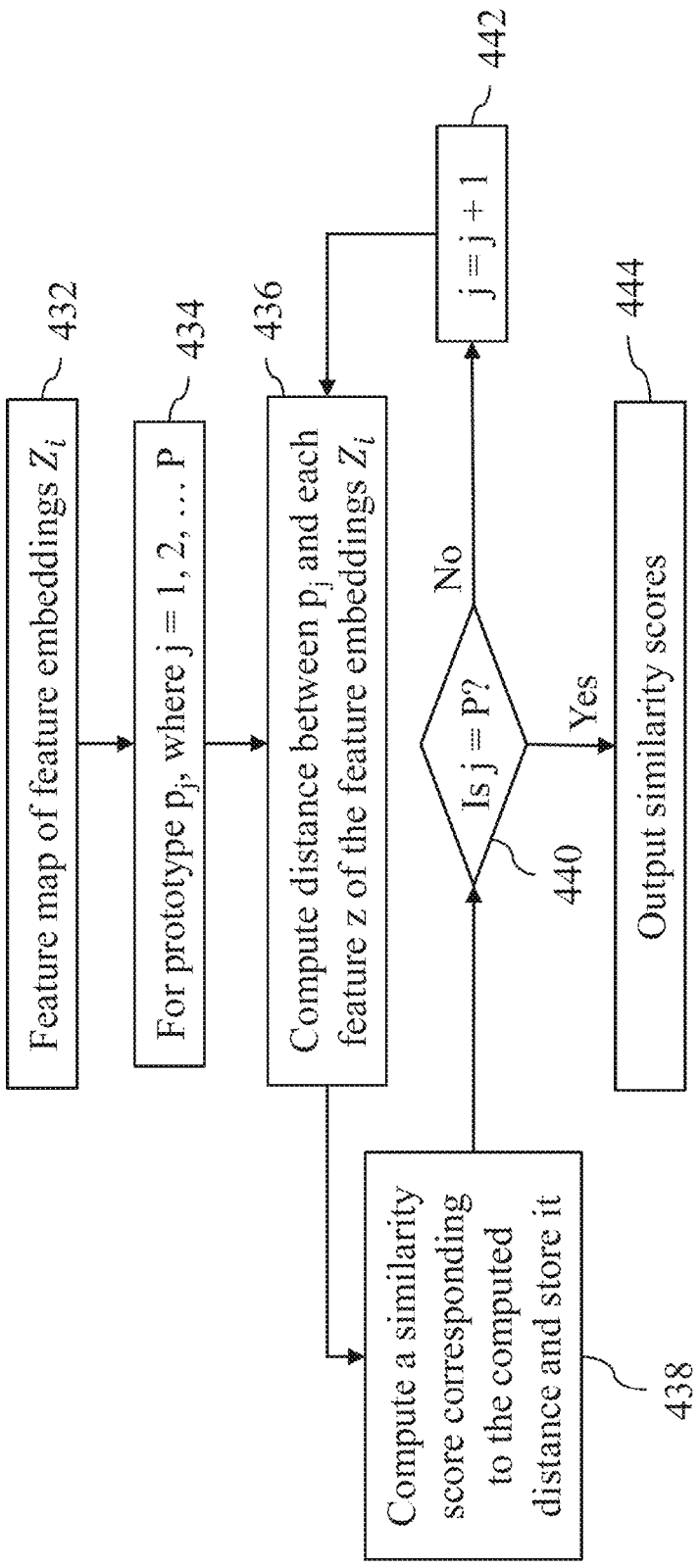
FIG. 4B illustrates a flowchart of steps performed by the prototype subnetwork of FIG. 4A, according to some example embodiments.

FIG. 4A illustrates a diagram of the prototype subnetwork 232B of the deep neural network of FIG. 2A, according to some example embodiments. FIG. 4B illustrates a flowchart of steps performed by the prototype layer of FIG. 4A, according to some example embodiments. The function features $(Z_i)$ yields a set of D-length embedded feature vectors in a sliding window manner as the output of the backbone subnetwork 232. The prototype subnetwork obtains the feature map of feature embeddings $Z_i$ 432. At the comparison layers 256, the prototypical parts 412 are compared 416 with the feature embeddings 414 using the pairwise distance notation to produce, for each prototypical part, a similarity map 418 between the prototypical part and each of the patches represented as feature embeddings 414 of the input image. The prototypical part may be represented as a D-length feature vector and each of the patches may also be represented as a D-length feature vector. According to some example embodiments, there may be a different similarity map for each prototypical part. Consider the notation $g_{p_j}$ to denote the unit that computes the most similar feature vector $z \in$ features $(Z_i)$ to prototype $p_j$. For each prototype $p_j$, where j=1, 2, ... P (initialization 434 of index), the pairwise distances between features $(Z_i)$ and prototypes $$\mathbb{P} = \{p_j\}_{j=1}^{P}$$

are computed 436 using a distance function j where $p_j \in \mathbb{R}^D$, where P is the total number of prototypes and $\mathbb{R}^D$ denotes the space of D-dimensional real-valued points i.e., $\mathbb{R}^D$ is the set of all possible D-length real-valued vectors. A vector p_j that is a member of $\mathbb{R}^D$ may be interpreted to mean p_j is a D-length real-valued vector. Each prototype is class-specific and the set of prototypes belonging to class $y_i$ may be denoted as $P_{y_i} \subseteq \mathbb{P}$.

Having obtained the pairwise distances between features $(Z_i)$ and prototypes $$\mathbb{P} = \{p_j\}_{j=1}^{P}$$

the control passes to the pooling layers 258 of FIG. 4A. At the pooling layers, a min-pooling operation is performed to obtain the closest embedded patch for each prototype—each prototype (this) is assigned a single embedded patch (that). Each of the closest embedded patches 422 corresponding to the prototypes are assigned a similarity score. In some example embodiments, the distances are converted 438 into similarity scores using a similarity function v. Steps 436 and 438 are repeated for all the prototypes, (that is unless j=P). In this regard, at step 440 a check is performed to determine if j=P, if not then j is incremented 442 by one and the control passes back to step 436 for computing the distance for next prototype. However, if steps 436 and 438 have been executed for all the prototypes, the control of steps passes to step 444 and the similarity scores are output to the readout subnetwork 232C. Putting this process altogether for unit $g_{p_j}$, we have $$g_{p_j}(Z_j) = v \left( \min_{z \in features(Z_i)} \varphi(z, p_j) \right)$$

The vector of all similarity scores for a sample are denoted as $s_i = g(Z_i) \in \mathbb{R}^P$. Here, $\varphi$ is the cosine distance:

$$\varphi(z, p_j) = 1 - \frac{z \cdot p_j}{\|z\|_2 \|p_j\|_2}$$

and $v$ is the similarity function:

$$v(d) = \log \left( \frac{1}{d + \varepsilon} + 1 \right)$$

where $\varepsilon$ is a constant. In some example embodiments, the constant $\varepsilon$ has a value of $1 \times 10^{-6}$ which prevents division by zero.

Figure 5A:
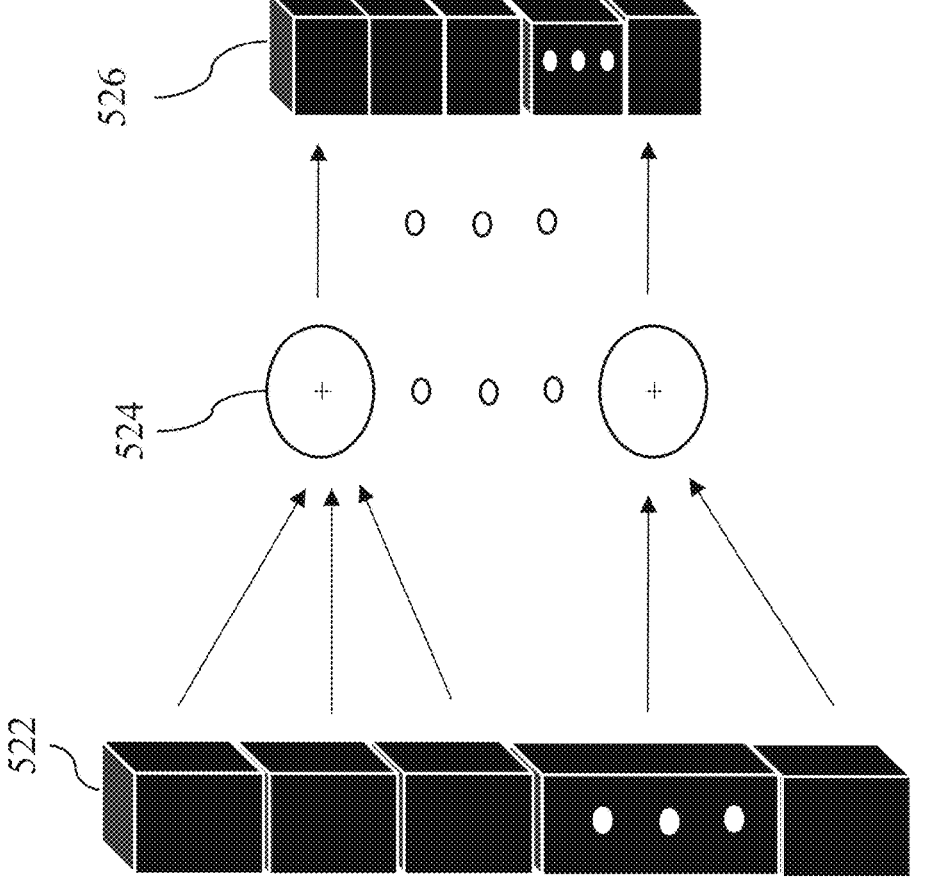
FIG. 5A illustrates a diagram of the readout subnetwork of the prototypical part neural network of FIG. 2A, according to some example embodiments.
Figure 5A:
Figure 5B:
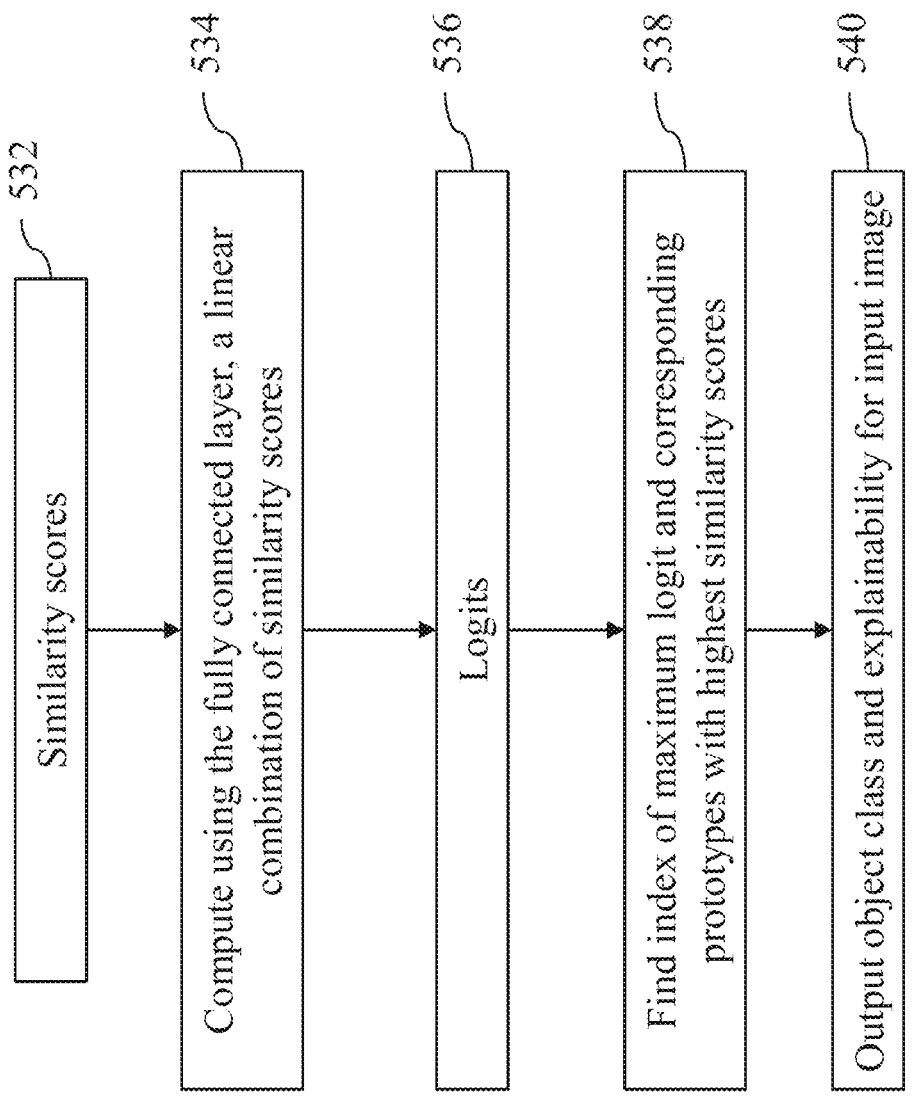
FIG. 5B illustrates a flowchart of steps performed by the readout subnetwork of FIG. 5A, according to some example embodiments.

FIG. 5A illustrates a diagram of the readout subnetwork 232C of the deep neural network of FIG. 2A, according to some example embodiments. FIG. 5B illustrates a flowchart of steps performed by the readout subnetwork 232C of FIG. 5A, according to some example embodiments. The readout subnetwork 232C of FIG. 2A and FIG. 5A produces the logits 526 as $\hat{y}_i = h(s_i)$. Logits corresponds to the votes for each object class. The readout subnetwork 232C is a fully-connected layer with positive weights to same-class prototype units and negative weights to non-class prototype units. Each of the logits 526 may be interpreted as the sum of similarity scores (amongst the scores 522) weighted by their importance to the class of that logit. The final output for an input image $x_i$ is given by $h(g(f(x_i))) \in \mathbb{R}^C$ where C is the number of object classes in the training set. In addition to the final output object classifications, the system also provides the best matching prototypes and the locations where they matched in the input image as the explanation of its output.

Referring to FIG. 5B, the method performed by the readout subnetwork is illustrated. The similarity scores 532 are used by the fully connected layers of the readout subnetwork to compute 534 a linear combination of the similarity scores to yield the logits 536. Thereafter, the index of the maximum logit and its corresponding prototypes with highest similarity scores are also determined 538. The object class and explainability data of the input image is then output 540 according to the prototype with highest similarity score determined at step 538. The final classification is the class corresponding to the logit with highest value (greatest total vote).

As described with reference to FIG. 1A, the explainability engine 132 may be implemented as an end device for AI-based image processing for use in several applications. In this regard, the explainability engine 132 may be implemented as an AI-based image processing engine. These use cases are described next with reference to FIGS. 6A and 6B.

Figure 6A:
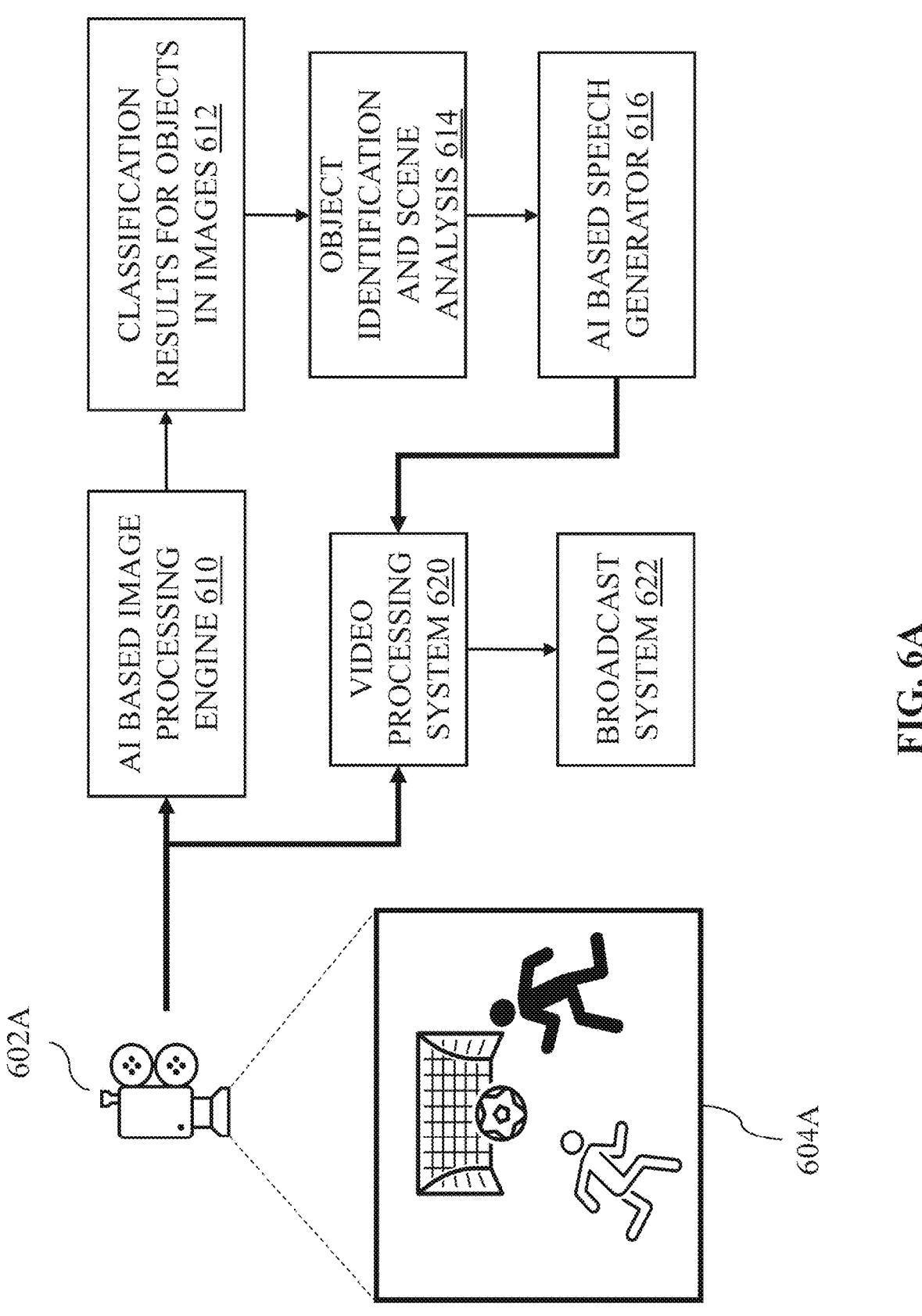
FIG. 6A illustrates an exemplar use case for generating context-based speech for a video, according to some example embodiments.

FIG. 6A illustrates an exemplar use case for generating context-based speech for a video using the AI-based image processing engine 610, according to some example embodiments. The image processing engine 610 is fed with input video provided by a suitable imaging source 602A. In some example embodiments, the input video may be live video such as video 604A of an ongoing soccer game and may be directly provided to the image processing engine 610. In some example embodiments, the video may be pre-captured and stored in a database such as the input image database 140 of FIG. 1A.

Irrespective of the source of the video, the image processing engine 610 processes the video by partitioning the video into individual frames or images and applies any suitable object detector algorithm to find image patches containing objects, each of which are processed in accordance with the workflow and processes illustrated with reference to FIGS. 1B-5B, to generate a plurality of classification results corresponding to the video 604A. According to some example embodiments, the classification results 612 may correspond to objects in the video and include one or more object classes and their explainability data providing justification for the corresponding classifications. For example, the classification results 612 may include an identification of object classes and attributes such as humans, gender, football/soccer players, ethnicity of the players, age, ball, soccer ball, goal post, grass, ground, crowd and the like. Along with these object classes, the image processing engine 610 may output an explanation of the reasoning behind the choice of the classes. The explanation may indicate the patches and regions of each of the video frames in which the object classes were found to exist, the location of the object classes in terms of pixels in such frames, and a contextual reasoning indicating the mapping between such regions and corresponding regions of the learned prototypes in training images.

The classification results 612 may be processed further for object identification and scene analysis 614. For example, according to some example embodiments, the indicated object classes and their locations and regions may be processed for identification of the underlying objects. In this regard the system may generate names of players identified in the frames, position of the players relative to the ground identified in the frame, their spatial relationship with regards to each other and the soccer ball and/or the goal post. Relating the identification results for a set number of sequential frames of the video 604A may provide a contextual analysis of the scene captured in the video. The results of the contextual analysis may be obtained as a part of the object identification and scene analysis 614 subprocess and may be provided to an AI-based speech generator 616 for generating a speech synthesized using phonetics that are in turn generated based on the result of the contextual analysis at 614. In this way, speech data corresponding to the video 604A may be generated and provided to a video processing system 620 that overlays the generated speech with the video 604A in a frame-synchronized manner and outputs the speech-overlayed video to a broadcast system 622 for output or storage as the need may be. In this manner, some example embodiments of the invention may help generate online commentary for sports, events or help describe a scene.

Figure 6B:
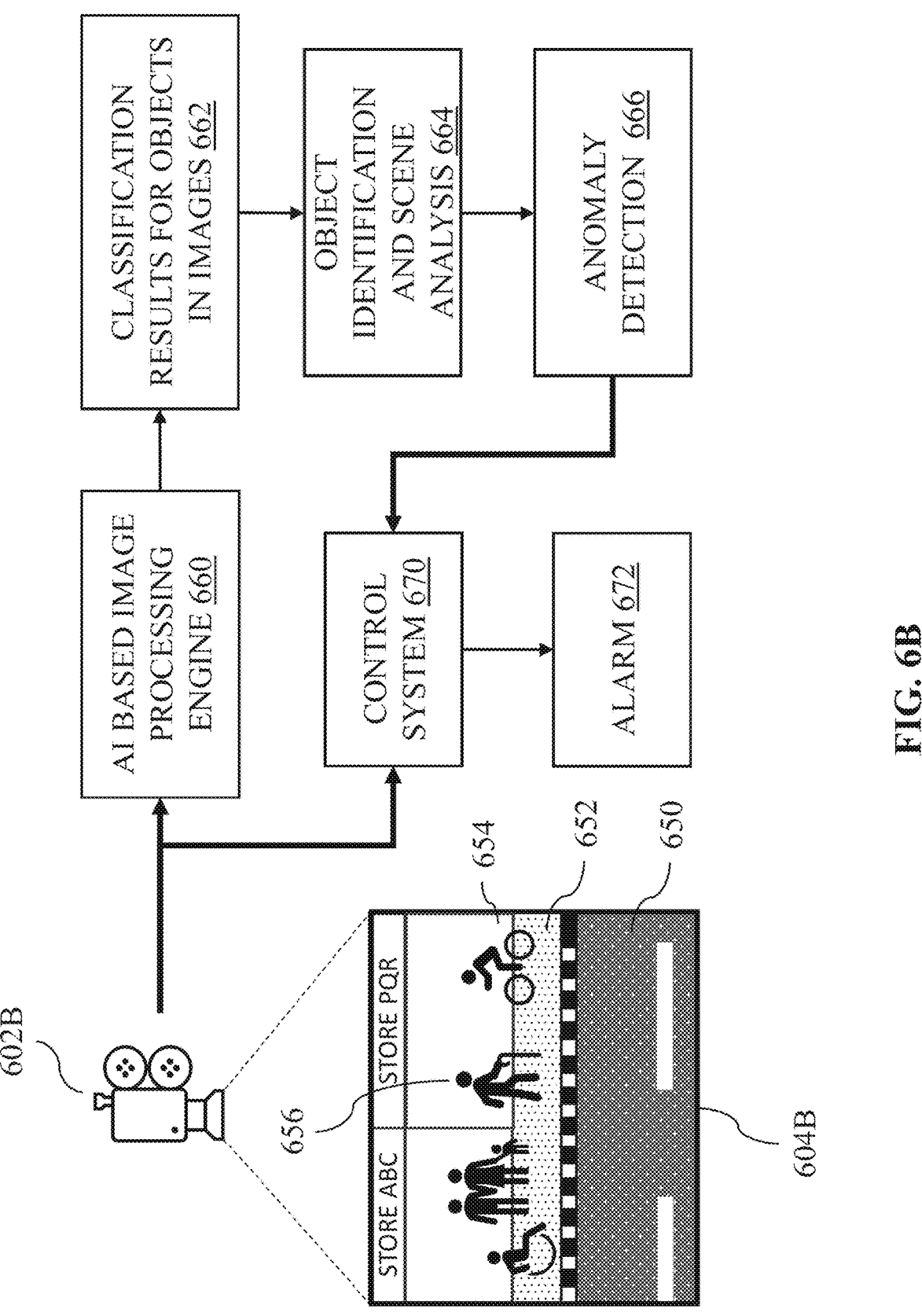
FIG. 6B illustrates another exemplar use case for detecting anomaly in a scene, according to some example embodiments.

FIG. 6B illustrates another exemplar use case for detecting anomaly in a scene using the AI-based image processing engine 660, according to some example embodiments. The image processing engine 660 is fed with input video provided by a suitable imaging source 602B. In some example embodiments, the input video may be live video such as video 604B of street sidewalk captured by a closed circuit television camera and may be directly provided to the image processing engine 660. In some example embodiments, the video may be pre-captured and stored in a database such as the input image database 140 of FIG. 1A.

Irrespective of the source of the video, the image processing engine 660 processes the video on a frame-to-frame basis by partitioning the video into individual frames or images and applies any suitable object detector algorithm to find image patches containing objects each of which are processed in accordance with the workflow and processes illustrated with reference to FIGS. 1B-5B to generate a plurality of classification results corresponding to the video 604B. According to some example embodiments, the classification results 662 may correspond to objects in the video and include one or more object classes and their explainability data providing justification for the corresponding classifications. For example, the classification results 662 may include an identification of object classes such as humans, animals, vehicles, structures, plants, gender, traffic category of the humans, and vehicles, category of the structures, and the like. Along with these object classes, the image processing engine 660 may output an explanation of the reasoning behind the choice of the classes. The explanation may indicate the patches and regions of each of the video frames in which the object classes were found to exist, the location of the object classes in terms of pixels in such frames, and a contextual reasoning indicating the mapping between such regions and corresponding regions of the learned prototypes in training images.

The classification results 662 may be processed further for object identification and scene analysis 664. For example, according to some example embodiments, the indicated object classes and their locations and regions may be processed for identification of the underlying objects. In this regard the system may identify the objects and subjects in the frames as humans>>pedestrian/cyclist/motorist>>walking/physically-disabled, gender and age, structures>>road/sidewalk/buildings/trees and the like, relative position of the objects with respect to each other etc. Relating the identification results for a set number of sequential frames of the video 604B may provide a contextual analysis of the scene captured in the video. The results of the contextual analysis may be obtained as a part of the object identification and scene analysis 664 subprocess and may be provided to an AI-based anomaly detector 666 for identifying an anomaly in the video based on the result of the contextual analysis at 664.

For example, the image processing engine 660 may provide objects classes such as humans, pedestrians, non-pedestrians, stray animals, pet animals, specially-abled persons, prohibited persons, road, sidewalk, store/shop etc along with the regions in the frames where these classes of objects were found. The object identification and scene analysis module 664 may further refine the object classes and identify them in the frames and build a contextual relation amongst the identified objects based on the classification results and their explainability. The anomaly detector 666 detects an anomaly in one or more of the frames of the video 604B using suitable approaches. For example, the anomaly detector 666 may detect it as an anomaly if a prohibited entity or activity is identified on the sidewalk or road. As is shown in FIG. 6B, the anomaly detector 666 may consider it as an anomaly since the cyclist 654 is identified to be on the sidewalk 652 of the road 650. However, the anomaly detector 666 does not consider it as an anomaly when a pedestrian 656 is detected on the sidewalk. In this way, AI-assisted anomaly detection may be performed for the video 604B and the detected anomaly may be indicated to a control system 670 that generates an alarm 672 for further action.

In this manner, example embodiments of the present invention provide improvement in the technical field of image processing by providing avenues for a faster processing of image patches for feature generation. The resultant architecture of the disclosed neural network provides performance improvements to the overall image processing task. Also, by providing explainability using the incomplete layers which have receptive field from local regions of the input image rather than the entire image, example embodiments described herein provide a more precise explanation of the reasoning behind the AI-based decision making.

Figure 6C:
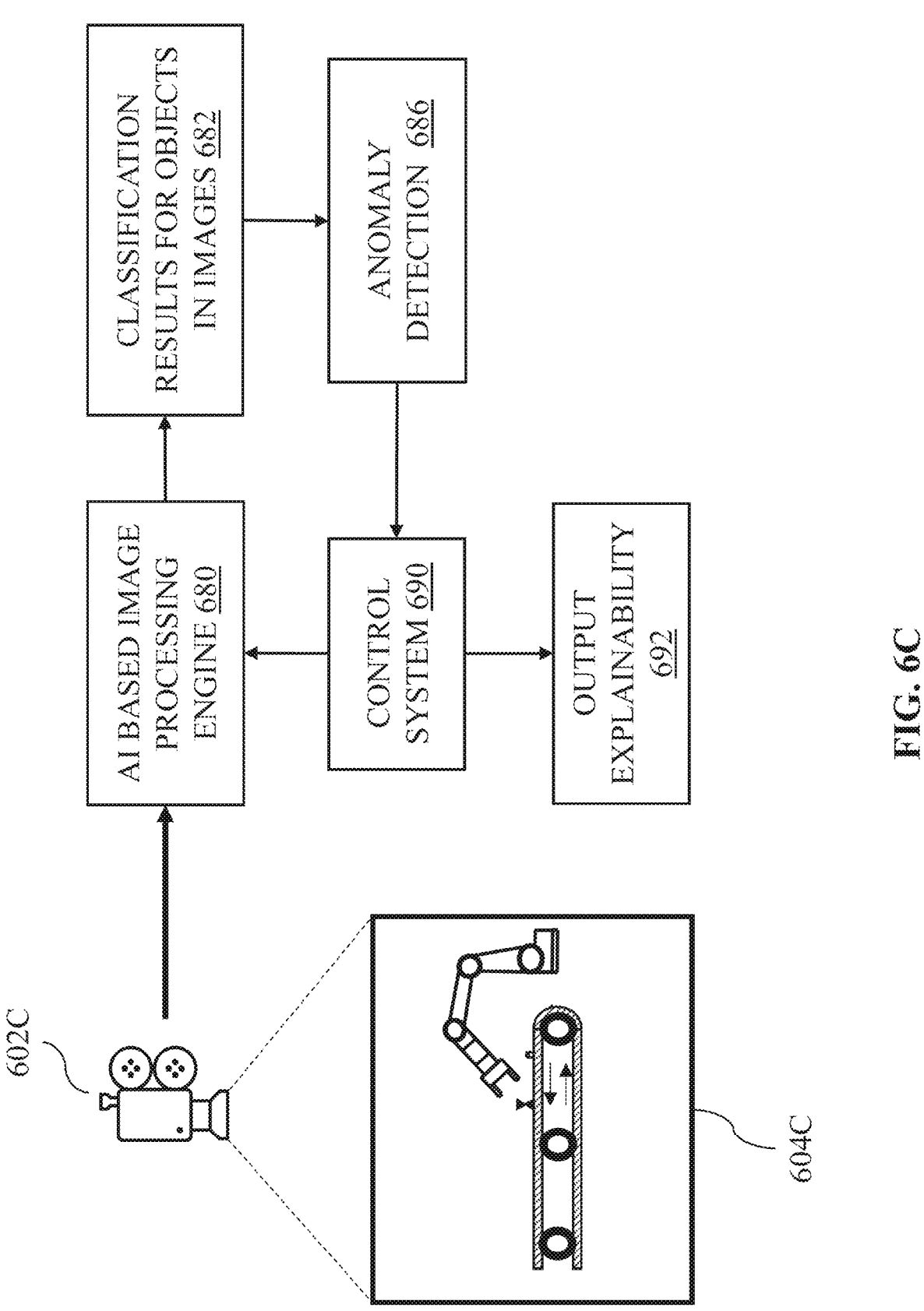
FIG. 6C illustrates another exemplar use case for explaining a detected anomaly in a factory set up, according to some example embodiments.

FIG. 6C illustrates another exemplar use case for explaining a detected anomaly in a factory using the AI-based image processing engine 680, according to some example embodiments. An imaging device such as the video camera 602C may capture an industrial process being performed in a factory set up. The industrial process may have predefined set points on a timeline at which some operations performed on an object should lead to predefined outcomes. The outcomes may be stored as prototypes for the setpoints and the AI image processing engine 680 may be trained using those prototypes. The video camera 602C may capture images 604C at each of the setpoints and provide them to the AI based image processing engine 680 which processes the incoming images 604C according to the workflow and processes described earlier with respect to FIGS. 1A-5B and outputs classification results for the input image 604C. In this regard, the AI-based image processing engine 680 may perform the object classification initially with a complete number of layers of the backbone subnetwork to output a precise classification for the identified objects in the input image 604C. An anomaly detector 686 may check the object class with respect to the setpoint to identify if it is same as the predefined prototype for that setpoint. If no anomaly is detected, the anomaly detector 686 may communicate the control system 690 to advance the industrial process according to the predefined workflow. However, if the classified object at 682 does not match with the predefined prototype for that set point, the anomaly detector 686 instructs the control system 690 to halt the industrial process or initiate another subprocess so that the industrial process is not advances to subsequent stages. At this juncture, the control system 690 may reduce the number of active convolution layers to be used in the backbone subnetwork of the AI-based image processing engine 680 to be less than the complete number of layers and re-run the image classification process with the reduced number of active layers to output a better explainability of the classification. The explainability results may be provided for rendering to an output device 692 so that an operator may run diagnostics according to the reasonings provided behind the classification.

In this way, example embodiments of the present invention may be used to help in understanding the reasons behind an anomaly and thus may assist in quick adoption of correction techniques in such mission critical processes.

It is well accepted that lack of explainability of the AI-model may lead to a lack of trust in the model. Accordingly, certain embodiments of the invention reflect an appreciation that AI explainability can assist in making a black box ML model's decision-making process less opaque in a way that is comprehensible to humans. As used herein, as it relates to a black box ML model's decision making process, less opaque broadly refers to providing sufficient visibility into the method by which a particular decision was made, the factors contributing to the decision, and their respective effect on the decision, such that a user can understand how and why the decision was made. Certain embodiments of the invention reflect an appreciation that the extent of, or degree of detail, such visibility may need to be provided may vary according to the particular needs of the user, the complexity of the decision, the context of the decision, or a combination thereof. Accordingly, the extent of such visibility, and the method by which it is generated and provided, is a matter of design choice. Accordingly, the preciseness and interpretability of the AI-based decision making, being subject to tunable parameters (choice of number of layers), are also tunable and can be adjusted according to desired needs. Thus, example embodiments bring about scalability and flexibility in the adoption and integration of such AI-based models to various application areas and tasks-something which standard/conventional models couldn't achieve.

The various devices, systems, modules and units described with reference to several example embodiments may be realized using some or all components of a computing system. One such computing system is disclosed with reference to FIG. 7 which illustrates a block diagram of a system for implementing some components of an AI-based image processing system, according to some example embodiments.

Figure 7:
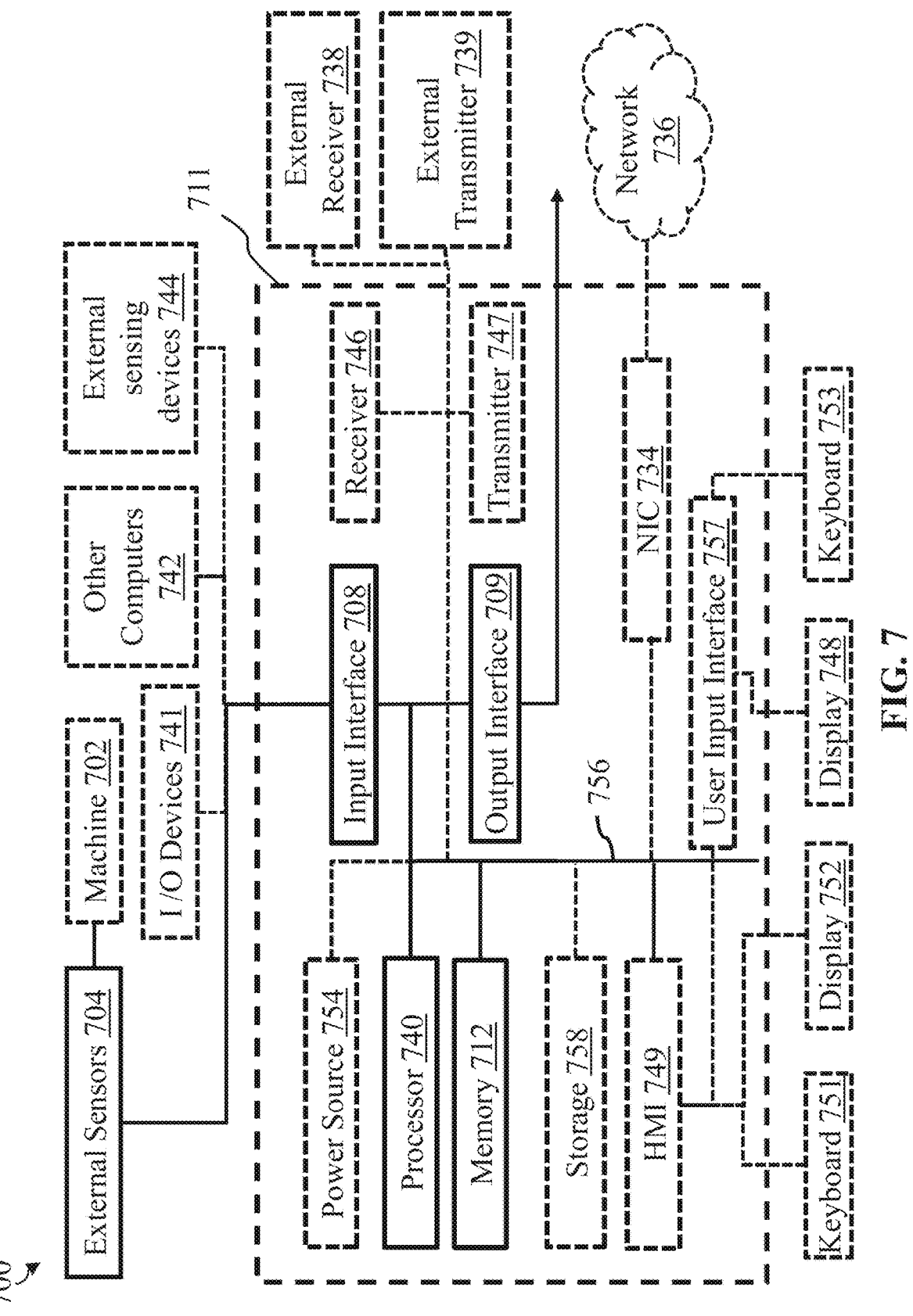
FIG. 7 illustrates a block diagram of a system for implementing some components of an AI-based image processing system, according to some example embodiments.

FIG. 7 illustrates a block diagram of a system 700 for implementing some components of the invention, according to some example embodiments. The component 711 includes a processor 740, a computer readable memory 712, storage 758 and user interface 749 with optional display 752 and keyboard 751, which are connected through bus 756. For example, the user interface 749 in communication with the processor 740 and the computer readable memory 712, acquires and stores the data in the computer readable memory 712 upon receiving an input from a surface, keyboard 753, of the user interface 757 by a user.

The component 711 can include a power source 754, depending upon the application the power source 754 may be optionally located outside of the component 711. Linked through bus 756 can be a user input interface 757 adapted to connect to a display device 748, wherein the display device 748 can include a computer monitor, camera, television, projector, or mobile device, among others. A network interface controller (NIC) 734 is adapted to connect through the bus 756 to a network 736, wherein image data or other data, among other things, can be rendered on a third-party display device, third party imaging device, and/or third-party printing device outside of the component 711.

Still referring to FIG. 7, electronic data, among other things, may be transmitted over a communication channel of the network 736, and/or stored within the storage system 758 for storage and/or further processing. Further, the time series data or other data may be received wirelessly or hard wired from a receiver 746 (or external receiver 738) or transmitted via a transmitter 747 (or external transmitter 739) wirelessly or hard wired, the receiver 746 and transmitter 747 are both connected through the bus 756. The component 711 may be connected via an input interface 708 to external sensing devices 744 and external input/output devices 741. For example, the external sensing devices 704 may include sensors gathering data before-during-after of the collected time-series data of the machine. The component 711 may be connected to other external computers 742. An output interface 709 may be used to output the processed data from the processor 740. It is noted that a user interface 749 in communication with the processor 740 and the non-transitory computer readable storage medium 712, acquires and stores data in the non-transitory computer readable storage medium 712 upon receiving an input from a surface of the user interface 749 by a user.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof.

When implemented in software, firmware, middleware or microcode, the program code or code segments to perform the necessary tasks may be stored in a machine-readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An artificial intelligence (AI) image processing system for interpretable classification of input images, comprising: a processor; and a memory having instructions stored thereon that, when executed by the processor, cause the AI image processing system to:

classify an input image with a prototypical part neural network including a backbone subnetwork, a prototype subnetwork, and a readout subnetwork to produce an interpretable classification of the input image including one or a combination of a classification result of the input image and an interpretation of the classification result, wherein the backbone subnetwork is trained with machine learning to process the input image with an incomplete sequence of active convolutional layers producing feature embeddings representing features extracted from pixels of different regions of the input image, wherein a complete sequence of the active convolutional layers causes each of the feature embeddings to include features derived from pixels of the entire input image, wherein the prototype subnetwork is trained to compare the feature embeddings with prototypical feature embeddings to produce results of comparison, and wherein the readout subnetwork is configured to analyze the results of comparison to produce the interpretable classification of the input image; and output the interpretable classification of the input image.

2. The AI image processing system of claim 1, wherein the processor is configured to classify the input image iteratively by the prototypical part neural network with a different number of the active convolutional layers in each iteration.

3. The AI image processing system of claim 2, wherein the processor is further configured to accept the number of the active convolutional layers as a parameter.

4. The AI image processing system of claim 1, wherein the backbone subnetwork comprises a plurality of core layers and add-on layers, and wherein the add-on layers change the number of channels in an output provided by the plurality of core layers.

5. The AI image processing system of claim 4, wherein the add-on layers comprise a first layer with a Rectified Linear Unit (ReLU) activation function and a second layer with a sigmoid activation function.

6. The AI image processing system of claim 1, wherein the prototype subnetwork produces a plurality of feature vectors corresponding to the features extracted from the pixels of different regions of the input image, computes pairwise distances between the feature vectors and the prototypical feature embeddings, and determines a closest embedded patch for each prototype based on the pairwise distances between the feature vectors and the prototypical feature embeddings.

7. The AI image processing system of claim 1, wherein the readout subnetwork comprises a fully connected layer that assigns positive weights to same-class prototype units and negative weights to non-class prototype units from among the results of comparison.

8. The AI image processing system of claim 1, wherein the classification result comprises at least one object class present in the input image, and wherein the interpretation of the classification result is defined in terms of image regions from prototypical parts for the at least one object class that best fit the input image.

9. The AI image processing system of claim 8, wherein the prototypical parts for the at least one object class that best fit the input image represent the reasons associated with a classification decision of the prototypical part neural network for classifying the input image in the at least one object class.

10. The AI image processing system of claim 8, wherein the prototypical parts correspond to training images associated with the at least one object class.

11. The AI image processing system of claim 10, wherein the processor is further configured to:

fetch a reference image from the memory, wherein the reference image is partitioned into a plurality of reference patches;

compare the image regions from the prototypical parts with the reference patches to determine if each of the image regions is similar to the at least one of the reference patches; and declare an anomaly if at least one of the image regions is dissimilar to all of the reference patches.

12. An image processing method for interpretable classification of input images, the image processing method comprising:

classifying an input image with a prototypical part neural network including a backbone subnetwork, a prototype subnetwork, and a readout subnetwork for producing an interpretable classification of the input image including one or a combination of a classification result of the input image and an interpretation of the classification result, wherein the backbone subnetwork is trained with machine learning for processing the input image with an incomplete sequence of active convolutional layers producing feature embeddings representing features extracted from pixels of different regions of the input image, wherein a complete sequence of the active convolutional layers causes each of the feature embeddings to include features derived from pixels of the entire input image, wherein the prototype subnetwork is trained for comparing the feature embeddings with prototypical feature embeddings to produce results of comparison, and wherein the readout subnetwork is configured to analyze the results of comparison to produce the interpretable classification of the input image; and outputting the interpretable classification of the input image.

13. The image processing method of claim 12, wherein the processor is configured to classify the input image iteratively by the prototypical part neural network with a different number of the active convolutional layers in each iteration.

14. The image processing method of claim 13, wherein the processor is further configured ti accept the number of the active convolutional layers as a parameter.

15. The image processing method of claim 12, wherein the backbone subnetwork comprises a plurality of core layers and add-on layers, and wherein the add-on layers change the number of channels in an output provided by the plurality of core layers.

16. The image processing method of claim 12, wherein the prototype subnetwork produces a plurality of feature vectors corresponding to the features extracted from the pixels of different regions of the input image, computes pairwise distances between the feature vectors and the prototypical feature embeddings, and determines a closest embedded patch for each prototype based on the pairwise distances between the feature vectors and the prototypical feature embeddings.

17. The image processing method of claim 12, wherein the readout subnetwork comprises a fully connected layer that assigns positive weights to same-class prototype units and negative weights to non-class prototype units from among the results of comparison.

18. The image processing method of claim 12, wherein the classification result comprises at least one object class present in the input image, and wherein the interpretation of the classification result is defined in terms of image regions from prototypical parts for the at least one object class that best fit the input image.

19. The image processing method of claim 18, wherein the prototypical parts for the at least one object class that best fit the input image represent the reasons associated with a classification decision of the prototypical part neural network for classifying the input image in the at least one object class.

20. The image processing method of claim 12, further comprising:

fetching a reference image from a memory, wherein the reference image is partitioned into a plurality of reference patches;

comparing the image regions from the prototypical parts with the reference patches to determine if each of the image regions is similar to the at least one of the reference patches; and declaring an anomaly if at least one of the image regions
is dissimilar to all of the reference patches.

* * * * *